Patented July 6, 1937

2,086,367

UNITED STATES PATENT OFFICE 2,086,367

COATING MATERIAL RECOVERY PROCESS

Seymour G. Saunders, Birmingham, and Harry Morrison, Detroit, Mich., assignors to Chrysler Corporation, Highland Park, Mich., a corporation of Delaware No Drawing. Application October 21, 1935, Serial No. 45,962. Renewed May 19, 1937

3 Claims. (Cl. 134—26)

This invention relates to an improved method of treating and reconditioning recovered solid constituents of sprayed coating materials.

More specifically, the invention pertains to a method for treating and reconditioning solid constituents of sprayed coating materials, particularly of the synthetic resin base type which have been recovered in accordance with the process described in our co-pending application, Serial No. 19,794, filed May 4, 1935.

One of the main objects of the invention is to provide a reconditioning process of this character by which the recovered solid constituents of coating materials can be economically restored substantially to their initial condition and brought to a state in which they will readily become dissolved, dispersed, or dissociated in the normal vehicles used in spraying applications.

Another object of the invention is to provide a reconditioning process of this character which does not require regrinding or other expensive and laborious treatment of the recovered solid materials.

A further object of the invention is to provide for repeated recovery and reuse of certain of the materials used in the reconditioning process.

Additional objects of the invention are to provide a method of this character during the practice of which no materials are used which injuriously react with the recovered coating substances under treatment, or, otherwise injuriously alter the state of the final product as compared with its initial condition; and to provide a reconditioning process of this character which by virtue of the extraction of oil and/or other undesirable impurities during one of the steps thereof brings the recovered product to a condition superior to its initial state for some purposes.

The recovered material obtained by precipitating, in a washing operation, the solid constituents of the excess sprayed surface coating from the air exhausted from a spray booth, is preferably collected in a sump or tank wherein it separates from the precipitating, washing solution. In the recovery of solid constituents of synthetic resin base coating materials, for example, by precipitation with an oil such as a mineral oil having a distillation temperature in the limits established by the distillation temperatures of kerosene and paraffin oil, the recovered material collects at the bottom of the sump from which it is removed in the form of a continuous mass of liver-like consistency. Heavy naphthas as well as kerosene have been found to function satisfactorily as precipitating agents for the class of synthetic resin base coating materials in which are included Glyptal, phenol formaldehyde, urea formaldehyde, vinylite and alkyd resin bases. Such coating materials conventionally comprise a volatile solvent and a dispersion of pigment in the resin and all other ingredients which make up the non-volatile vehicle of the coating material. In the mass obtained by precipitation with mineral oil in the above manner, the pigment is dispersed in the non-volatile vehicle. This mass is placed in a tank and to it is added an excess quantity of suitable solvent for the precipitating washing liquid which remains with the recovered mass. Solvents such as light naphtha, gasolene and other hydrocarbon solvents which have distillation temperatures in the neighborhood thereof may be employed for this purpose, light naphtha being preferable. The mixture of solvent for the precipitating washing liquid and the recovered solid constituents of the coating material is then heated and agitated to break up the precipitate into finely divided particles and to dissolve and wash out the precipitating liquid. This operation may be conducted in a conventional agitator, preferably while maintaining the temperature of the charge substantially at 140° F., the temperature required being variable within substantial limits and, naturally, depending upon the nature and composition of the sprayed material from which the solid constituents have been recovered. The resulting finely divided particles of the recovered solid constituent are allowed to settle out and they are thereafter separated from the liquid of the mixture by drawing off the latter or by filtration, if desired. The reconditioned recovered material may then be dissolved in toluol, xylol or any other suitable solvent and prepared before reuse in a conventional manner. When kerosene or a heavy naphtha is employed as a precipitating agent and thereafter removed from the recovered mass by washing the latter with light naphtha, the resulting recovered material can be readily dissolved in xylol or toluol.

Although the temperature at which the mixture of washing solvent and solid material is heated is not critical, it is desirable to employ this heating operation in order to break up the recovered substances into finely divided particles. This heating operation may precede the agitating step or the heating and agitating may be conducted simultaneously. It is found that the recovered solid constituents, particularly of sprayed synthetic resin base enamels are not only reconditioned in the above manner to its initial state but, in fact, improved for the purpose of reuse as an enamel base. It is thought that this improvement results from the removal of oils and/or other undesirable ingredients during the washing operation to extract the precipitating liquid, which impurities had not been removed in the initial preparation of the coating material.

The light naphtha or other washing solvent may be redistilled and used over again, thereby greatly reducing the operating cost of the reconditioning process.

Although but several specific embodiments of the invention are herein described, it will be understood that various changes in the method and materials set forth may be made without departing from the spirit of the invention.

We claim:

1. The process of reconditioning a mineral oil precipitate of sprayed coating material including a solid mineral oil contaminated dispersion of the non-volatile vehicle and pigment of such coating material which consists in adding to said dispersion a solvent for said mineral oil in which said dispersion is both insoluble and stable, heating said dispersion to condition it to be wetted by said solvent and simultaneously breaking it into finely divided particles by agitation while heated, and removing said finely divided particles from said solvent.

2. The process of reconditioning a mineral oil precipitate of sprayed coating material including a solid mineral oil contaminated dispersion of the non-volatile vehicle and pigment of such coating material which consists in adding to said dispersion a solvent for said mineral oil in which said dispersion is both insoluble and stable, heating said dispersion to condition it to be wetted by said solvent and simultaneously breaking it into finely divided particles by agitation while heated, removing said finely divided particles from said solvent, and dissolving said particles in a coating material solvent.

3. The process of reconditioning a mineral oil precipitate of sprayed coating material including a solid mineral oil contaminated dispersion of the non-volatile vehicle and pigment of such coating material which consists in adding to said dispersion a solvent for said mineral oil comprising a petroleum distillate having a lower distillation temperature than said mineral oil and in which said dispersion is both insoluble and stable, heating said dispersion to condition it to be wetted by said solvent and simultaneously breaking it into finely divided particles by agitation while heated, and removing said finely divided particles from said solvent.

HARRY MORRISON.
SEYMOUR G. SAUNDERS.